United States Patent [19]
Urabe et al.

[11] 3,737,228
[45] June 5, 1973

[54] CONTACT PRINTER FOR PHOTOGRAPHIC MATERIAL

[75] Inventors: Hitoshi Urabe; Kimitoshi Nagao; Masao Takano; Shigeru Watanabe, all of Ashigara-Kamigun, Kanagawa, Japan

[73] Assignee: Fuji Photo Film Co., Ltd., Kanagawa, Japan

[22] Filed: Apr. 26, 1972

[21] Appl. No.: 247,672

[30] Foreign Application Priority Data

Apr. 26, 1971 Japan.................................46/27353

[52] U.S. Cl........................355/78, 355/91, 355/133, 356/109
[51] Int. Cl..............................................G03b 27/02
[58] Field of Search..........................355/78, 91, 132, 355/133; 356/108, 109

[56] References Cited

UNITED STATES PATENTS

| 3,359,852 | 12/1967 | Wilczynski et al. | 356/109 |
| 3,455,634 | 7/1969 | Guffon | 355/91 |
| 3,542,473 | 11/1970 | Herte | 356/109 |
| 3,604,800 | 9/1971 | Jordan | 355/91 |
| 3,625,611 | 12/1971 | Orr | 355/91 X |

Primary Examiner—John M. Horan
Assistant Examiner—Richard M. Sheer
Attorney—Sughrue, Rothwell, Mion, Zinn, & Macpeak

[57] ABSTRACT

A vacuum contact printer for photographic material wherein the degree of contact between an original document and a photosensitive material can be determined even during operation of a vacuum pump by examining an interference fringe of a coherent light.

5 Claims, 5 Drawing Figures

PATENTED JUN 5 1973 3,737,228

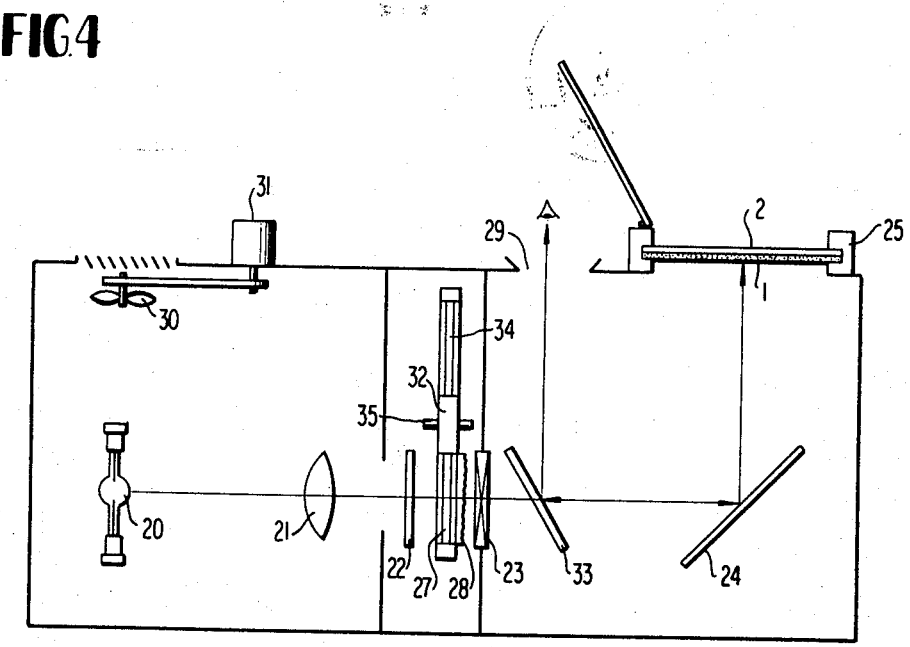
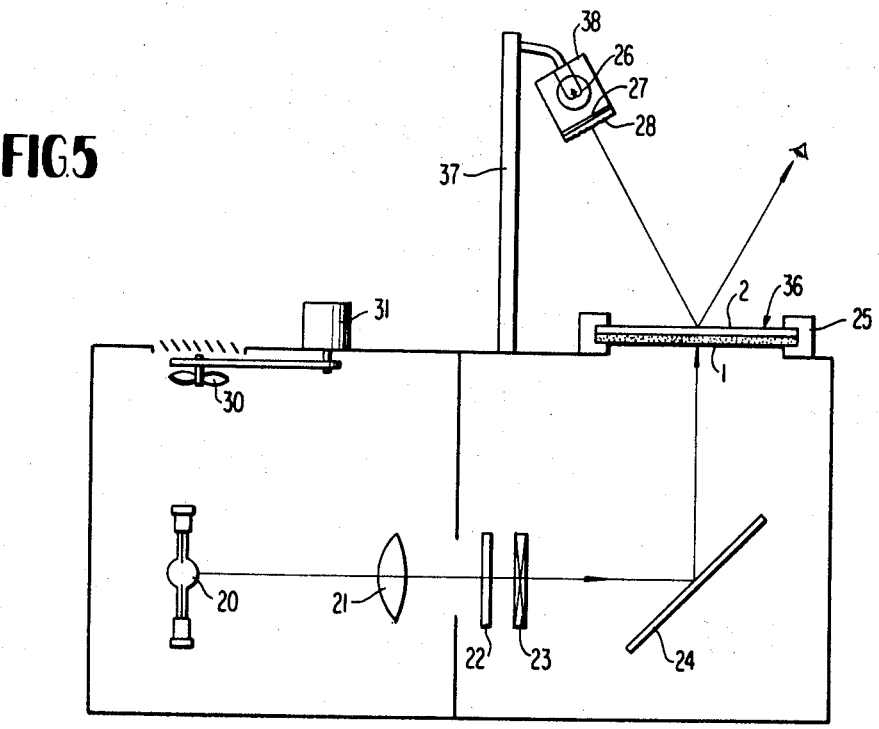

CONTACT PRINTER FOR PHOTOGRAPHIC MATERIAL

BACKGROUND OF THE INVENTION

1. Field of the Invention

The present invention relates to a contact printer by which vacuum contact exposing and printing can be carried out with a determination of the degree of contact between a light penetrable original pattern and a photographic material to be printed at the time when the original pattern and the photographic material are loaded in the printing mechanism. The detection of the degree of contact is accomplished by a light interference method. The contact printer of the present invention is effective in printing many kinds of patterns, such as for the production of integrated circuits, the production of printing plates, and the printing of recording materials for high information capacity, such as microfilms.

2. Description of the Prior Art

One method of optically printing an original pattern on a photographic material includes focusing the original pattern on the photographic material by interposing a lens between the original pattern and the photographic material as found in an enlarging printer, a plate making camera, etc. Another method is the contact printing method used in the field of microphotography or the production of integrated circuits.

In the former method, an acceptable image having good sharpness can be obtained by varying position of the lens or the distance between the lens and the photographic material so as to assure proper focus at printing.

In the latter method, production of an image having high sharpness depends upon the degree of contact between the original pattern and the photographic material.

In order to improve the degree of contact, one method is to press the original pattern and the photographic material together, for example, by applying pressure thereto by laying the photographic material on the original pattern, putting a rubber bag on the material, and inflating the rubber bag by supplying it with the air. In another method, a vacuum is used by loading the original pattern and the photographic material in a superposed relation into a cassette having a special structure, and then removing the air from the cassette.

For example, in a case of producing integrated circuits, it is required to carry out contact printing many times with many stages of photomasks which are produced by a reduction camera, called a photo-repeater. In this case, it is necessary for the integrated circuit pattern to record fine lines of 1 $\mu$ or so, and optical focusing of the camera or the contact printer is an important factor as is the sharpness of the photographic material. The Optical Transfer Function of lenses has been studied by many learned societies and construction of practical optical apparatus has been planned so as to obtain an image having as high sharpness as possible based on this function. However, optical focusing, as affected by the degree of contact between the original and the photographic material, has received little study, since it has been assumed that the degree of contact must be good, because the pressure is reduced by a vacuum pump or is applied by pressing strongly, and consequently that an image having good sharpness will be obtained. Recently, even though optical focusing and the degree of contact has been studied somewhat, there has been no teaching, either of an apparatus for contacting and printing while determining the degree of contact, or of determining the degree of contact (on which the sharpness of the printed image depends) at the time of loading the original pattern and the photographic material into the printing mechanism of the contact printer, that is, at the time printing is actually possible.

Accordingly, hitherto, the printing has been carried out under the assumption that sufficient contact exists on the basis of past data obtained by actual printing. Therefore, to obtain the high accuracy required in printing for producing integrated circuits, it is necessary to confirm that the contact is sufficient at the time of printing, because the actual printing is carried out without confirming the degree of contact.

SUMMARY OF THE INVENTION

An object of the present invention is to produce exactly at any time a print having good sharpness by determining the degree of contact between the original pattern and the photographic material at the time of printing. This determination is the important factor for producing an image having good sharpness and is accomplished in this invention by detection means utilizing light interference techniques together with means for controlling the degree of contact. The present invention is characterized by a printing mechanism in which the light penetrable original pattern and the photographic material are superposed and brought into close contact by a vacuum, a printing light source mechanism for applying the printing light to the printing mechanism and a detection light source mechanism for applying to the printing mechanism a light ray for detecting the degree of contact, the light ray being within a wavelength range which will not sensitize the photographic material.

BRIEF DESCRIPTION OF THE DRAWINGS

FIGS. 3, 4 and 5 are side views of different embodiments of the main components of the contact printer of the present invention.

DESCRIPTION OF THE PREFERRED EMBODIMENTS

Figure 1:
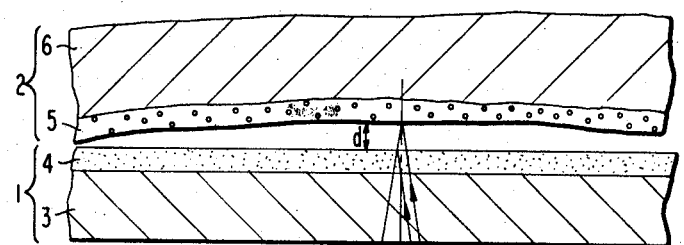
FIG. 1 is a cross-sectional view illustrating the principle of the detection of the degree of contact by the light interference method utilized in the present invention.

It is already generally known to use light interference fringes to detect and determine the distance between two plates or surfaces. FIG. 1 illustrates one embodiment of the invention in which the distance between an original pattern and a photographic material, that is, the degree of contact, is detected by using light interference fringes.

An original pattern or document 1 is superposed on a photographic or photosensitive material 2. When light of a spectrum which does not excite the sensitive layer 5 of the photographic material 2 is applied obliquely to the sensitive layer through the original pattern 1, a light interference fringe, corresponding to the space or distance $d$, is formed by the light passed through the pattern support layer 3 and reflected at the boundary of the pattern image layer 4 and the space between the original pattern 1 and the photographic material 2 and by the light passed through the image layer 4 and reflected at the boundary of the space $d$ and the surface of the sensitive layer 5 of the material 2.

In this case, the following formula exists:

$$n \lambda = 2d \cos\theta,$$

wherein $n$ is an integer, $\theta$ is the angle of incidence of the light, $d$ is the space or distance layers 4 and 5, and $\lambda$ is the wavelength of the light. Since $\theta$ and $\lambda$ are the fixed values, the space $d$ between the original pattern 1, actually image layer 4, and the photosensitive material 2, actually sensitive layer 5, can be determined on the basis of the following formula when $n$ is determined:

$$d = n \lambda/2 \cos\theta$$

Determination of n can be carried out by a photoelectric detecting counter. In a case of using a photographic material which does not have a light shielding layer at the back thereof, it is possible to determine the interference fringe formed by the light interference phenomenon by applying a light (to which the sensitive layer is insensitive) through the support base of the photographic material.

When the degree of contact between the original pattern 1 and the photographic material 2 is poor, the number of interference fringes which appears therebetween is large. The interference fringe is also formed by the presence of a mote between the original and the photosensitive material.

Figure 2:
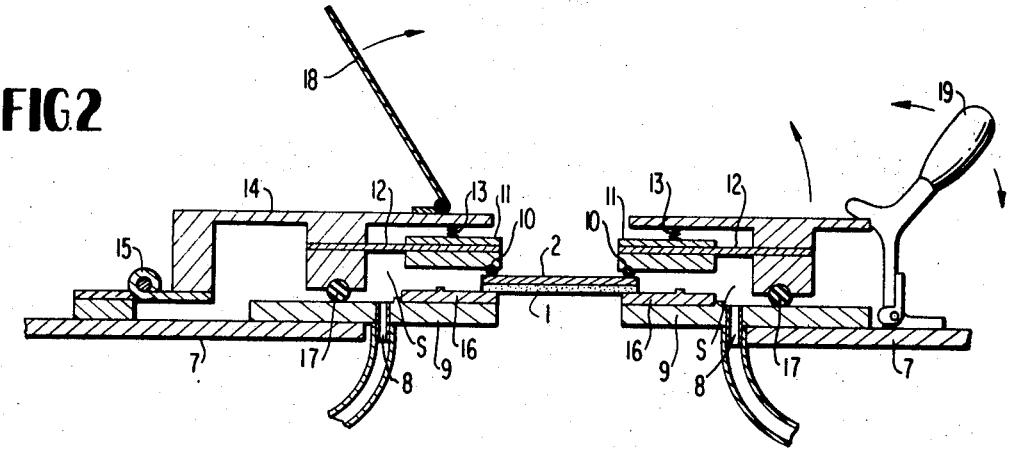
FIG. 2 is a side cross-sectional view of the printing components of the contact printer of the present invention.

A vacuum contact type printing mechanism used in the present invention, and which can be used in a common contact printer, will be described below in connection with FIG. 2.

A frame plate 9 having an exhaust opening 8 which communicates with a vacuum pump (not shown) is fixed in an opening of a contact printer body 7. A contact cover 14 is pivotally mounted by means of a hinge joint 15 so as to be positioned over the frame plate 9. The contact cover 14 is equipped with a contact press plate 11 having a contact rubber ring 10 at the underside thereof which is supported by an airtight member 12. A pressing spring 13 is mounted between plate 11 and cover 14. 16 is a spacer made from an airtight material which can be exchanged according to the thickness of the original pattern 1 and the photographic material 2. 17 is an airtight rubber ring provided on the underside of the contact cover 14. 18 is an observation cover window hinged on the upper surface of the contact cover 14. 19 is a press handle for pressing the contact cover 14 against the frame plate 9.

On the spacer 16 of the printing part constructed as described above, there is laid an original pattern 1, the image layer of which faces upward. Then, a photographic material 2, the sensitive layer of which faces downward, is superposed on this original pattern. The contact cover 14 is shut and fixed by press handle 19 to form an airtight chamber S. The air is then removed from the exhaust-opening 8 by operating the vacuum pump so that the pressure in the airtight chamber S decreases. Thus, the air between the original pattern 1 and the photographic material 2 is removed, and the degree of contact between the original pattern 1 and the photographic material increases. Usually, in many cases, the space between the original pattern 1 and the photographic material 2 is eliminated when the degree of vacuum in the airtight room S becomes $10^{-1}$ Torr or so.

The printing light source mechanism consists of an optical system comprising a light source, for example, a tungsten lamp, iodine lamp, mercury lamp, xenon lamp, xenon flash lamp, etc., a lens or a mirror, and means, such as a time switch and shutter, for providing a predetermined time exposure.

Because the light used in the detection light source mechanism must have a wavelength range which will not sensitize the photographic material, a light filter which passes only this wavelength range is provided in front of the light source. It is especially preferably to use such a filter to pass light which is monochromatic or nearly so.

The contact printer of the present invention will be explained below in connection with FIGS. 3 to 5 in which are illustrated various embodiments of the detecting light source mechanism for detecting the degree of contact between the original pattern and the photographic material.

Figure 3:
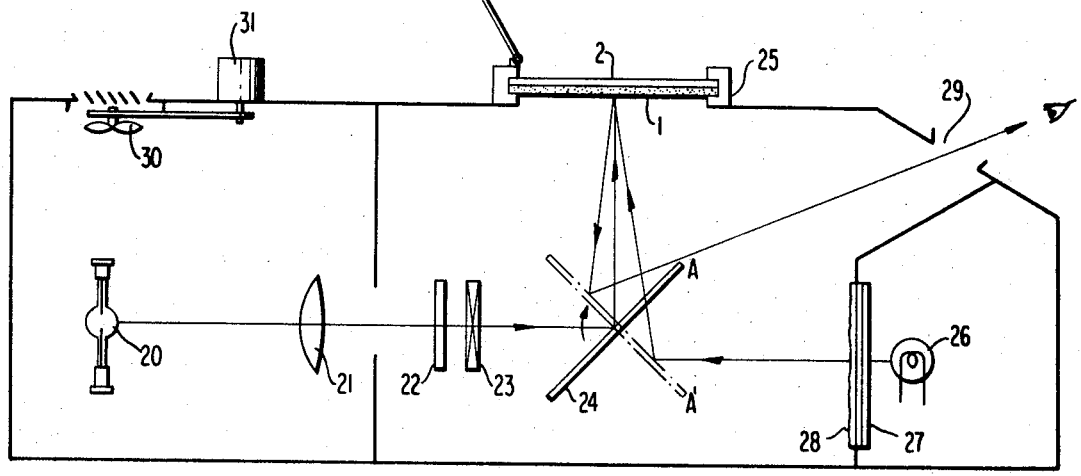

FIG. 3 illustrates an embodiment in which the light for printing and exposing and the light for detecting the degree of contact are provided by different sources. The light emitted from an exposing light source 20, such as an Hg lamp, Xe lamp, Xe flash lamp, iodine lamp or tungsten lamp, passes through a lens 21 and a heat-proof filter 22. When a shutter 23 is opened, the light is reflected upward by a movable mirror 24 to expose and print the photographic material 2 which is superposed on an original pattern 1 loaded in the printing mechanism 25. On the other hand, the light emitted from a light source 26 for detecting the degree of contact passes through a filter 27 which passes only light which is nearly monochromatic and has a wavelength to which the photographic material is insensitive. The output of the filter passes through a light diffusion plate 28 and is reflected upward by the movable mirror 24 which moves from the position A to the position A′ to expose the photographic material 2 and the original pattern 1 loaded in the printing part 25. The reflected light is reflected by mirror 24 at the position A′ and is directed to an observation window 29. 30 is a cooling fan and 31 is a motor for rotating the cooling fan.

FIG. 4 illustrates an embodiment in which the exposing and printing light source is also utilized as the light source for detecting the degree of contact between the original pattern and the photographic material.

A common optical system for printing and exposing includes the exposing light source 20, lens 21, heat-proof filter 22, shutter 23 and mirror 24. The system also includes a turret 32 having an optical filter 27 through which passes only light of an approximately monochromatic wavelength to which the photographic material is insensitive. The filter output passes through a light diffuser 28 and a half mirror 33 which reflects the light for detecting the degree of contact to the observation window 29. In the turret 32, a light transmissive opening 34 not having a filter is provided at a position which is symmetrical to an axis of rotation 35. Accordingly, when observing the degree of contact between the original pattern 1 and the photographic material loaded in the printing mechanism 25, the turret 32 is rotated until the filter comes to the position of light passage. By opening the shutter, the light emitted from the exposing light source 20 passes through the lens 21, the heat-proof filter 22, and then through the optical filter 27, the light diffusion plate 28 and the half mirror 33 and is reflected upward to be directed toward the printing mechanism 25. Thus, the light reflected by the original pattern 1 and the photographic material 2 is reflected upward by the mirror 24 and then by the half mirror 33 upward so that it is directed to the observation window 29. For exposing, the shutter is closed and the turret 32 is rotated to the position where the light transmissive opening is in the path of the light beam. Thus, by opening the shutter 23 for a predetermined time, the exposure is carried out.

FIG. 5 illustrates an embodiment that is suitable for contact printing the original pattern to a photographic material which has no light shielding layer on the back thereof, in which case the light source mechanism for detecting the degree of contact is mounted above the contact printer body. The printing light source mechanism is not different from that of the prior printer, but an exposing observation window 36 is provided on the upper surface of the printing mechanism 25. The light for detecting the degree of contact is emitted from the light source 26 in a lamp housing 38 mounted on a pole 37 and passes through a light filter 27 which passes only light which is nearly monochromatic and of a wavelength which will not sensitize the photographic material. The filter output passes through light diffuser 28 to expose the photographic material 2 and the original pattern 1 through the observation window 36, and the reflected light is observed.

In the use of the contact printer of the present invention, the optical system is set to observe the degree of contact, and the original pattern and the photographic material are loaded in the printing mechanism so that they are superposed. Then the vacuum pump is operated for a short time till the degree of contact reaches a predetermined number of interference fringes, for example till the number of interference fringes decreases or the fringes disappear. When the degree of contact reaches the predetermined value, the exposing light source is set for exposing, and the exposing and printing are carried out by opening the shutter or controlling it by a timer. However, when the degree of contact does not reach the predetermined value, the photographic material is exchanged for another one or the chamber pressure is reduced further till the desired degree of contact is obtained. Sometimes, the interference fringes do not decrease partially to the predetermined number no matter how much the chamber pressure may be reduced. In such a case, since dust may be the problem, the pressure is reduced again after removing the dust. Another factor causing poor contact may be that flatness of the original pattern or the photographic material is inferior or that the capacity of the vacuum pump is insufficient. In such cases, it will be understood at once that replacement and adjustment are required.

Furthermore, if coherent light, such as laser, is used as the light source for detecting the degree of contact, determination of the degree of contact is carried out more easily because the interference fringe becomes clear.

In the present invention, as described above, the degree of contact between the original pattern and the photographic material can be determined at the time the original pattern and the photographic material are loaded in the printing mechanism in a superposed relation and the vacuum pump is operated. Accordingly, since the degree of contact can be confirmed during or just before the printing and exposing, the sharpness of the printed pattern can be determined before development.

While the invention has been particularly shown and described with reference to preferred embodiments thereof, it will be understood by those skilled in the art that various changes in form and detail may be made therein without departing from the spirit and scope of the invention.

What is claimed is:

1. A contact printer for exposing photosensitive material to an original document to be copied comprising printing means having an airtight vacuum chamber for closely contacting a light penetrable original document and a photosensitive material, printing light source means for applying light to such original document and photosensitive material in a wavelength range to expose such photosensitive material, and detecting light source means for applying light to such original document and photosensitive material in a wavelength range to which such photosensitive material is insensitive for producing light interference fringes via reflection of such light from the surfaces of such original document and photosensitive material so as to permit the detection of the degree of contact between such original document and photosensitive material.

2. A contact printer for exposing a photosensitive material as defined in claim 1 wherein said detecting light source means is positioned to apply the light through a side of such light penetrable original document.

3. A contact printer for exposing a photosensitive material as defined in claim 1 wherein said detecting light source means is positioned to apply the light through a side of such photosensitive material.

4. A contact printer for exposing a photosensitive material as defined in claim 1 wherein said detecting light source means comprises a light filter which passes only light in a wavelength range to which such photosensitive material is insensitive, said filter being movably positioned in the path between said printing light source means and said printing means, whereby the printing light source means provides the light for detecting the degree of contact between such original document and photosensitive material.

5. A contact printer for exposing a photosensitive material as defined in claim 1 further comprising means to enable observation of the light interference fringes generated by the reflection of such light from the surface of such original document such photosensitive material, which surfaces define a contact space therebetween.

* * * * *